(12) United States Patent
Shea et al.

(10) Patent No.: US 10,654,156 B2
(45) Date of Patent: May 19, 2020

(54) ADAPTER FOR COMBUSTION TOOL FUEL CELLS

(71) Applicant: Illinois Tool Works Inc., Glenview, IL (US)

(72) Inventors: Maureen L. Shea, Chicago, IL (US); Anna Ky, Harwood Heights, IL (US); DeShaunne LeAnne Owens, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/210,751

(22) Filed: Dec. 5, 2018

(65) Prior Publication Data

US 2019/0105765 A1      Apr. 11, 2019

Related U.S. Application Data

(62) Division of application No. 15/353,433, filed on Nov. 16, 2016, now Pat. No. 10,166,666.

(60) Provisional application No. 62/259,868, filed on Nov. 25, 2015.

(51) Int. Cl.
*B25C 1/08* (2006.01)
*B25C 1/18* (2006.01)

(52) U.S. Cl.
CPC . *B25C 1/08* (2013.01); *B25C 1/18* (2013.01)

(58) Field of Classification Search
CPC .................................. B25C 1/08; B25C 1/18
See application file for complete search history.

(56) References Cited

U.S. PATENT DOCUMENTS

| 2,828,892 | A | 4/1958 | Ward |
| 2,998,168 | A | 8/1961 | Waldherr |
| 3,073,489 | A | 1/1963 | Friedman |

(Continued)

FOREIGN PATENT DOCUMENTS

| EP | 1254745 | 11/2002 |
| EP | 2815851 | 12/2014 |

OTHER PUBLICATIONS

Paslode Quicklode Fuel Cartridge Image, http://static.grainger,com/rp/s/is/image/Grainger/31EE19_AS01?hei=800&wid=935, Jan. 19, 2016, (1 page).

(Continued)

*Primary Examiner* — Nicolas A Arnett
(74) *Attorney, Agent, or Firm* — Neal, Gerber & Eisenberg LLP

(57) ABSTRACT

An adapter is provided for use in combination with a fuel cell having a closure formation. The adapter includes a fuel cell closure ring configured for engagement upon the closure formation of the fuel cell and including a top edge, a bottom edge, and a sidewall therebetween having an inner sidewall surface and an outer sidewall surface. At least one groove is defined by the inner sidewall and has at least one primary recess in communication with the at least one groove. At least one secondary recess is in communication with the groove. A metering valve has a body and at least one depending leg with a radially extending foot formation configured for engaging the groove. At least one supplemental locking lug is located on the leg and is constructed and arranged for engaging the at least one secondary recess.

3 Claims, 10 Drawing Sheets

(56) References Cited

U.S. PATENT DOCUMENTS

| | | |
|---|---|---|
| 3,610,481 A | 10/1971 | Marraffino |
| 4,207,934 A | 6/1980 | Scremin et al. |
| 4,331,119 A | 5/1982 | Chadwick |
| 4,331,277 A | 5/1982 | Green |
| 4,403,722 A | 9/1983 | Nikolich |
| 4,483,474 A | 11/1984 | Nikolich |
| 4,522,162 A | 6/1985 | Nikolich |
| 4,721,240 A | 1/1988 | Cotta |
| 4,902,043 A | 2/1990 | Zillig et al. |
| 5,115,944 A | 5/1992 | Nikolich |
| 5,169,038 A | 12/1992 | Di Giovanni |
| 5,211,316 A | 5/1993 | Adalberto et al. |
| 5,263,439 A | 11/1993 | Doherty et al. |
| 5,368,231 A | 11/1994 | Brunerie et al. |
| 5,482,083 A | 1/1996 | Jenski |
| 5,632,421 A | 5/1997 | Colombo |
| 5,695,096 A | 12/1997 | Yquel |
| 5,697,532 A | 12/1997 | Wilde et al. |
| 5,730,326 A | 3/1998 | Kaeser |
| 5,904,274 A | 5/1999 | Warby et al. |
| 5,927,563 A | 7/1999 | Kellner |
| 6,058,960 A | 5/2000 | Kopp |
| 6,085,945 A | 7/2000 | Fransen |
| 6,176,412 B1 | 1/2001 | Weinger et al. |
| 6,202,900 B1 | 3/2001 | Tsutsui et al. |
| 6,217,085 B1 | 4/2001 | Toulouse |
| 6,302,297 B1 | 10/2001 | Richardson et al. |
| 6,311,876 B1 | 11/2001 | Liu |
| 6,315,173 B1 | 11/2001 | Di Giovanni et al. |
| D457,811 S | 5/2002 | Vanstaan et al. |
| 6,419,168 B1 | 7/2002 | Thieleke et al. |
| 6,520,377 B2 | 2/2003 | Yquel |
| 6,543,814 B2 | 4/2003 | Bartholomew |
| 6,578,573 B2 | 6/2003 | Koch |
| 6,644,306 B1 | 11/2003 | Riebe et al. |
| 6,681,955 B2 | 1/2004 | Rosenbaum |
| 6,786,378 B2 | 9/2004 | Wagdy et al. |
| 6,796,478 B2 | 9/2004 | Shkolnikov et al. |
| 7,296,719 B1 | 11/2007 | Taylor et al. |
| 7,392,922 B2 | 1/2008 | Vanstaan et al. |
| 7,478,740 B2 | 1/2009 | Shea et al. |
| D590,840 S | 4/2009 | Shea et al. |
| 7,571,841 B2 | 8/2009 | Gibson et al. |
| 7,591,249 B2 | 9/2009 | Wagdy et al. |
| 7,654,429 B2 | 2/2010 | Shea et al. |
| 7,661,568 B2 | 2/2010 | Vanstaan et al. |
| 7,757,920 B2 | 7/2010 | Shea et al. |
| 7,841,499 B2 | 11/2010 | Ho |
| 7,841,500 B2 | 11/2010 | Ho |
| D633,922 S | 3/2011 | Shea et al. |
| 7,980,440 B2 | 7/2011 | Hahn et al. |
| D645,053 S | 9/2011 | Shea et al. |
| 8,042,718 B2 | 10/2011 | Taylor et al. |
| 8,302,831 B2 | 11/2012 | Taylor et al. |
| D681,677 S | 5/2013 | Shea et al. |
| 8,720,764 B2 | 5/2014 | Ploss |
| 8,777,183 B2 | 7/2014 | Carrato et al. |
| 8,939,339 B2 | 1/2015 | Vanstaan et al. |
| D787,290 S | 5/2017 | Meyer et al. |
| D812,101 S | 3/2018 | Crawford et al. |
| 10,166,666 B2 * | 1/2019 | Shea .................. B25C 1/08 |
| 2002/0108992 A1 | 8/2002 | Shkolnikov et al. |
| 2004/0206798 A1 | 10/2004 | Robinson |
| 2008/0000451 A1 | 1/2008 | Shea et al. |
| 2009/0001722 A1 | 1/2009 | Yoshihiro et al. |
| 2009/0269651 A1 | 10/2009 | Yoshihiro et al. |
| 2014/0069981 A1 * | 3/2014 | Ricordi ............... B25C 1/008 227/8 |
| 2014/0175143 A1 | 6/2014 | Vanstaan et al. |
| 2017/0343211 A1 | 11/2017 | Crawford et al. |

OTHER PUBLICATIONS

Yagid, Rob, "Cordless finish nailer", HowItWorks, The Taunton Press, Inc. Jun./Jul. 2011, (2 pages).

ECKO MultiCell, ECKO Fastening Systems, Available prior to May 27, 2016, (4 pages).

ECKO FuelCell Cordless Fastening System Images, Available prior to May 27, 2016 (3 pages).

International Search Report and Written Opinion in pending Application No. PCT/US2016/062529, dated Mar. 21, 2017 (11 pages).

International Preliminary Report on Patentability for International Application No. PCT/US2016/062529, dated Jun. 7, 2018 (7 pages).

\* cited by examiner

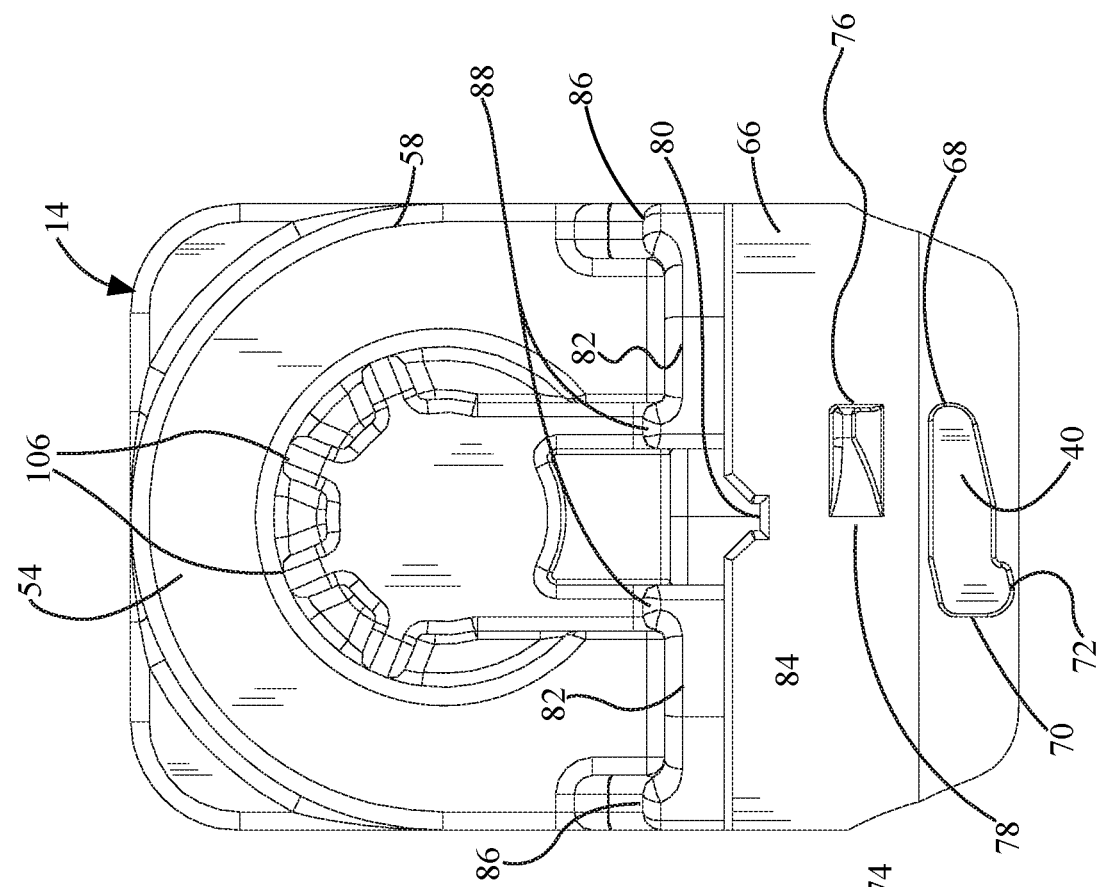
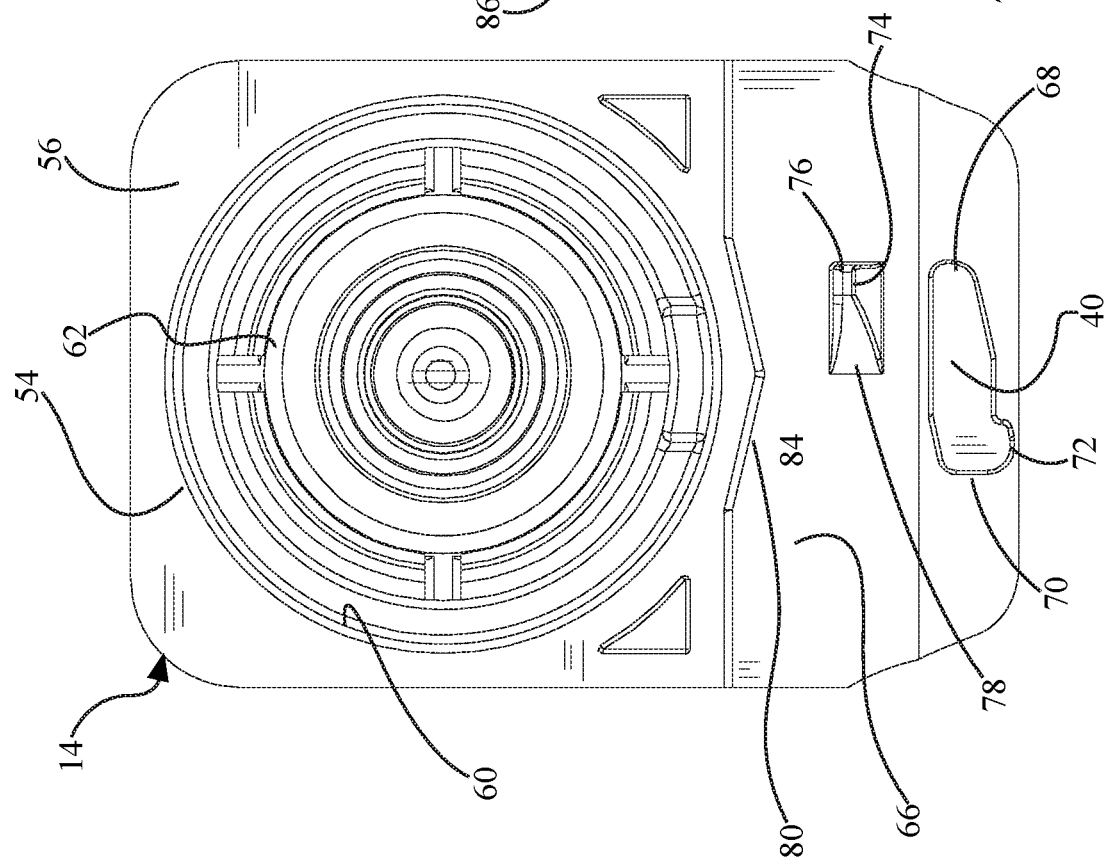

ADAPTER FOR COMBUSTION TOOL FUEL CELLS

PRIORITY CLAIM

This patent application is a divisional of, and claims priority to and the benefit of, U.S. patent application Ser. No. 15/353,433, filed on Nov. 16, 2016, which claims priority to and the benefit of U.S. Provisional Patent Application No. 62/259,868, filed Nov. 25, 2015, the entire contents of each of which are incorporated herein by reference.

BACKGROUND

This prevent disclosure relates generally to improvements in fuel cell fuel delivery arrangements for use in combustion tools, and more specifically to an adapter for use on a fuel cell for delivering the appropriate amount of fuel from the fuel cell for use by a combustion powered tool during the driving of fasteners. While the present disclosure is focused on the use of fuel cells in combustion powered tools, other applications are contemplated in which fuel cells or other pressurized containers using stem valves are employed, such as, but not limited to, cosmetics and pharmaceutical products.

As exemplified in U.S. Pat. Nos. 4,403,722; 4,483,474; 4,522,162; 5,115,944; and 7,571,841, all of which are incorporated by reference herein, it is known to use a dispenser such as a fuel cell to dispense a hydrocarbon fuel to a combustion powered tool, also known as a combustion gas-powered tool, such as, for example, a combustion gas-powered fastener-driving tool, also known as a combustion nailer. Such fastener-driving tools and fuel cells are available commercially from ITW-Paslode (a division of Illinois Tool Works, Inc.) of Vernon Hills, Ill., under its IMPULSE trademark.

Commonly-assigned U.S. Pat. No. 7,571,841 discloses an adapter for a fuel cell including a ring frictionally clamped upon a closure end of the fuel cell, and a metering valve that is threadably engageable to the ring. More specifically, the ring defines a helical track, and the metering valve includes a pair of depending legs, each leg having a generally radially outwardly extending foot constructed and arranged for threadably engaging the track of the ring. Once the metering valve is engaged on the ring and fully rotated until the feet reach the end of the tracks, the valve is considered to be in operational position. In addition, a depending "V"-shaped projection on the metering valve engages a corresponding groove on an upper surface of the ring to lock the valve in position. Once in position, the metering valve is in engagement with a valve stem of the fuel cell. Proper locking engagement of the metering valve upon the ring is desired to reduce the potential for unwanted release of fuel from the fuel cell.

If the metering valve is not fully or properly engaged on the ring, the valve stem may not be fully depressed. In this condition, no fuel is dispensed, and the combustion nailer will not fire.

Further, the associated combustion nailer is configured to exert a force on the metering valve, either on the reciprocating valve stem or on the valve body itself, to cause the stem to retract against a biasing force in the metering valve to dispense a measured dose of fuel from the fuel cell. It is important for fuel economy in the fuel cell, and desired operation of the combustion nailer, for only the designated amount of fuel to be supplied to the combustion nailer on a dosage basis.

Thus, there is a need for an improved combustion nailer fuel cell adapter.

SUMMARY

The above-listed needs are met or exceeded by the combustion nailer fuel cell adapter of various embodiments of the present disclosure. In various embodiments of the present disclosure, the adapter includes a fuel cell closure ring that engages or is configured to engage the closure or closure formation of the fuel cell, and a metering valve that threadably engages or is configured to threadably engage the fuel cell closure ring. One feature of the present adapter is a more positive engagement between the metering valve and the fuel cell closure ring. In addition, a positive locking stop formation is provided to supplement the engagement of the metering valve feet in the tracks in the fuel cell closure ring so that the user receives a tactile indication that the metering valve is properly and fully engaged on or in the fuel cell closure ring. Another feature is an actuator extension projecting beyond a rear leg of the metering valve that is more readily engaged by corresponding actuator mechanisms on a wider variety of combustion nailers.

More specifically, in various embodiments of the present disclosure, an adapter is provided for use in combination with a fuel cell having a closure or closure formation. The adapter includes a fuel cell closure ring configured for engagement upon the closure formation of the fuel cell, and including a top edge, a bottom edge, and a sidewall therebetween having an inner sidewall surface and an outer sidewall surface. At least one groove is defined by the inner sidewall surface. The fuel cell closure ring or inner sidewall surface thereof has at least one primary recess in communication with the at least one groove. The fuel cell closure ring or inner sidewall surface thereof also has at least one secondary recess in communication with the at least one groove. A metering valve has a body and at least one depending leg with a radially extending foot formation configured for engaging the at least one groove. At least one supplemental locking lug is located on the leg and is configured and arranged for engaging the at least one secondary recess.

In another embodiment of the present disclosure, an adapter is provided for use with a fuel cell in a combustion tool, the combustion tool having an actuator. The adapter includes a fuel metering valve having a body with a first end configured to receive a reciprocating metering stem and an opposite second end, and at least one leg depending from the body and having an exterior surface. The second end has at least one tool actuating formation extending beyond the exterior surface and constructed and arranged for being engaged by the actuator for dispensing a dose of fuel from the metering stem.

Other objects, features, and advantages of the present disclosure will be apparent from the following detailed disclosure, taken in conjunction with the accompanying sheets of drawings, wherein like reference numerals refer to like parts.

BRIEF DESCRIPTION OF THE FIGURES

FIG. 4 is a front elevational view of the metering valve of FIG. 1.

FIG. 5 is a rear elevational view of the metering valve of FIG. 1.

DETAILED DESCRIPTION

Figure 1:
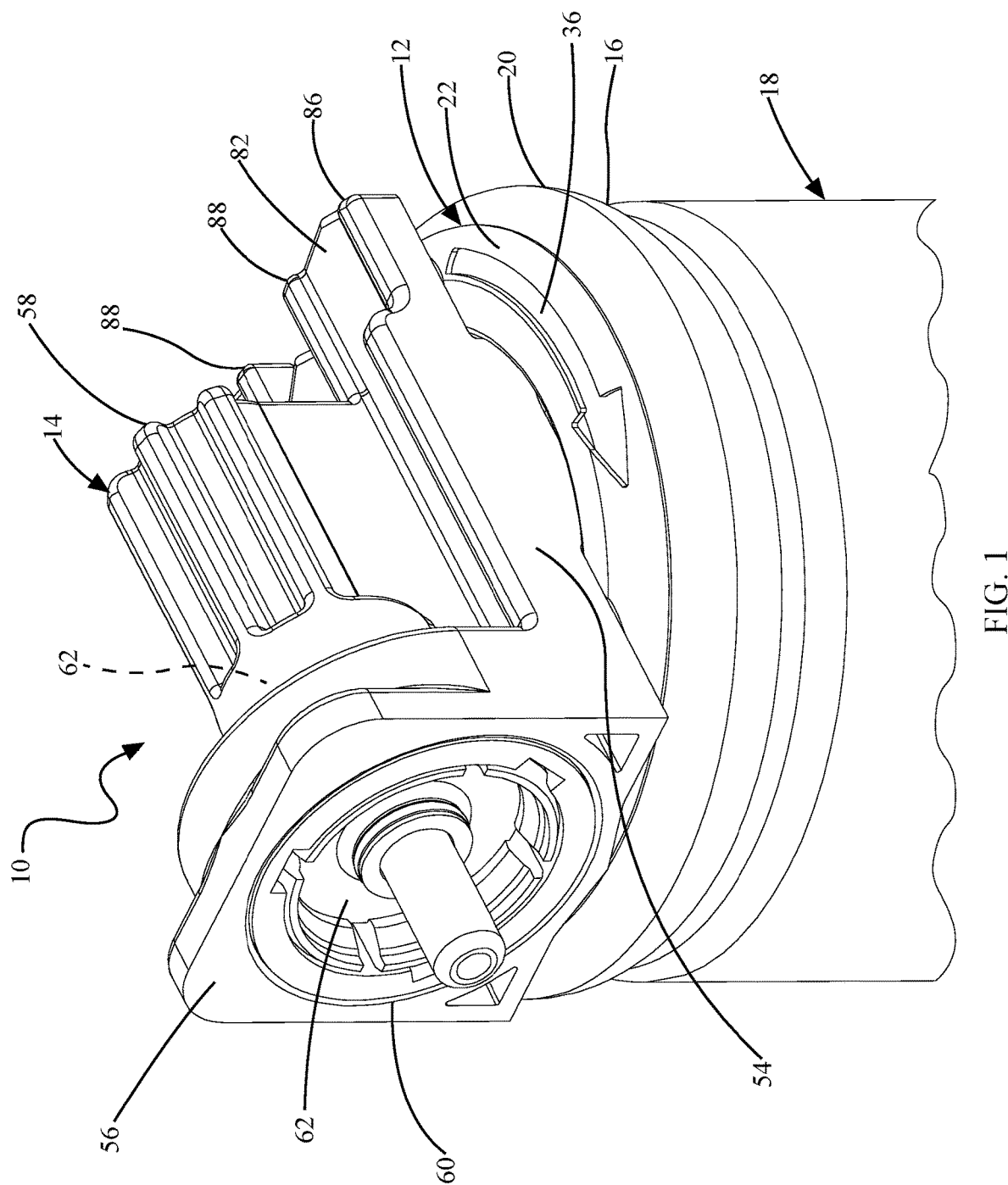
FIG. 1 is a top perspective view of the adapter of one embodiment of the present disclosure, wherein the adapter includes a metering valve of one embodiment of the present disclosure that is shown engaged in a fuel cell closure ring of one embodiment of the present disclosure that is in turn shown mounted to a fuel cell (shown in fragmentary).
Figure 11:
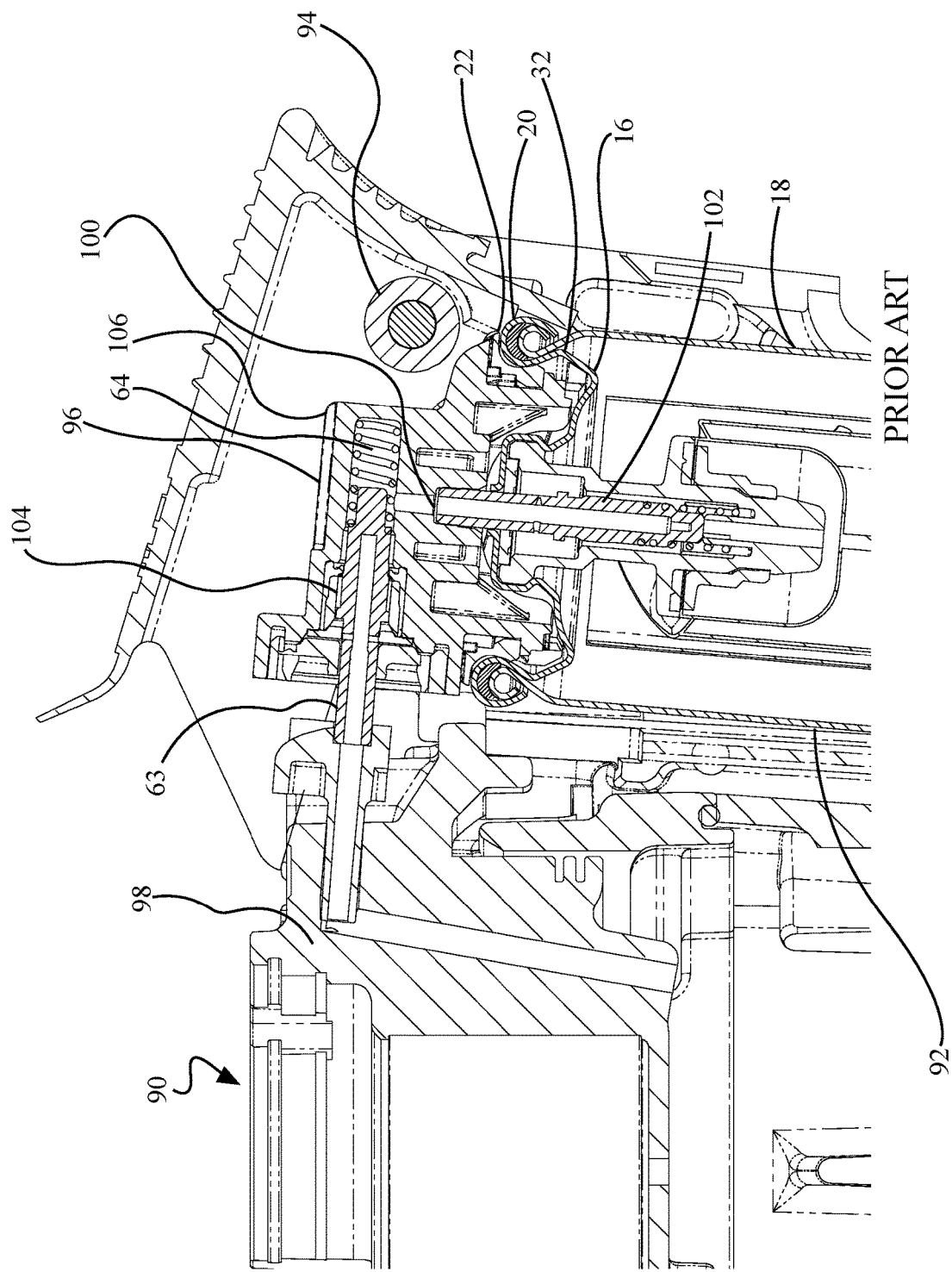
FIG. 11 is a fragmentary vertical cross-sectional view of a fuel cell equipped with a prior art adapter disposed in a combustion nailer.
Figure 12:
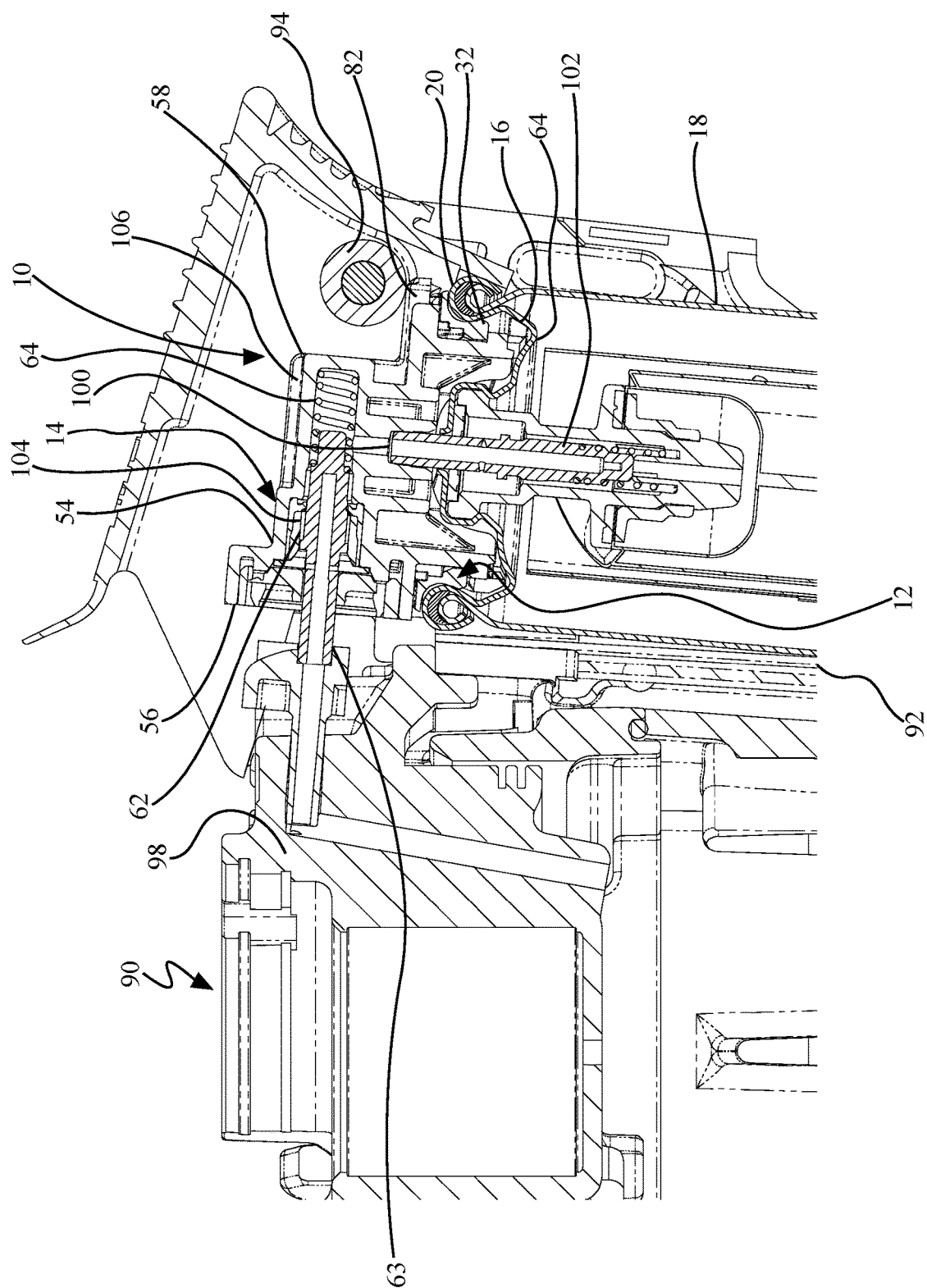
FIG. 12 is a fragmentary vertical cross-sectional view of the adapter of FIG. 1 shown in a combustion nailer.

Referring now to FIGS. 1 to 8, an adapter for a combustion nailer fuel cell of one example embodiment of the present disclosure is generally designated 10. This illustrated example adapter 10 includes a fuel cell closure ring 12 and a metering valve 14. The fuel cell closure ring 12 is configured for frictionally engaging a closure or closure formation 16 of a fuel cell 18 (as generally shown in FIGS. 1, 11, and 12) at a peripheral bead 20. It will be understood that the present adapter 10 shares many components and features with a similar adapter disclosed in commonly-assigned U.S. Pat. No. 7,571,841 which is incorporated by reference herein. Once the fuel cell closure ring 12 is frictionally engaged on the fuel cell 18, the metering valve 14 is threadably engaged on or in the fuel cell closure ring 12. Features of the present adapter 10 include a configuration that enhances positive engagement of the metering valve 14 on or in the fuel cell closure ring 12, as well as a tactile indication to the user that the metering valve 14 is fully engaged on or in the fuel cell closure ring 12.

Figure 2:
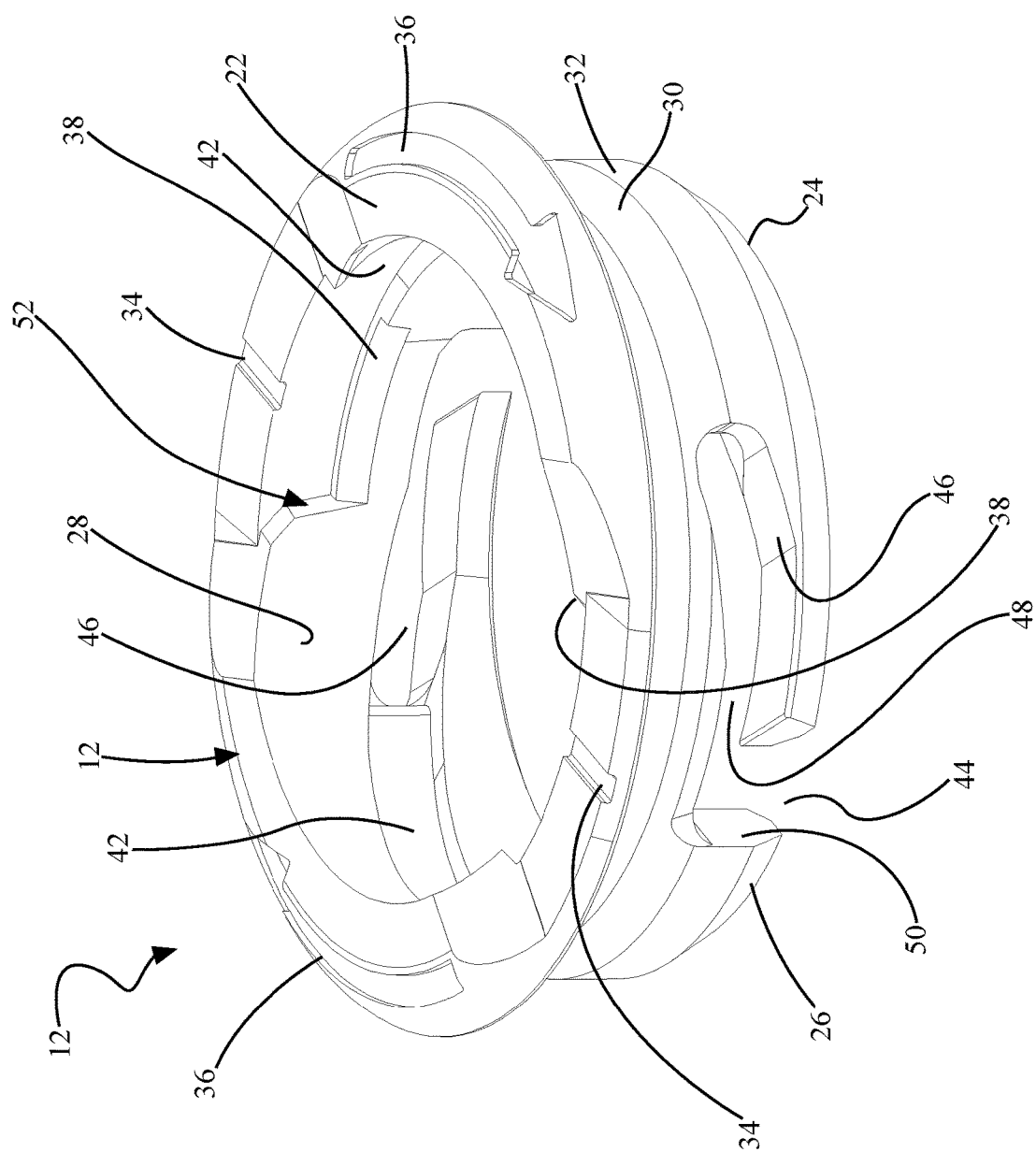
FIG. 2 is a top perspective view of the fuel cell closure ring of FIG. 1.
Figure 3:
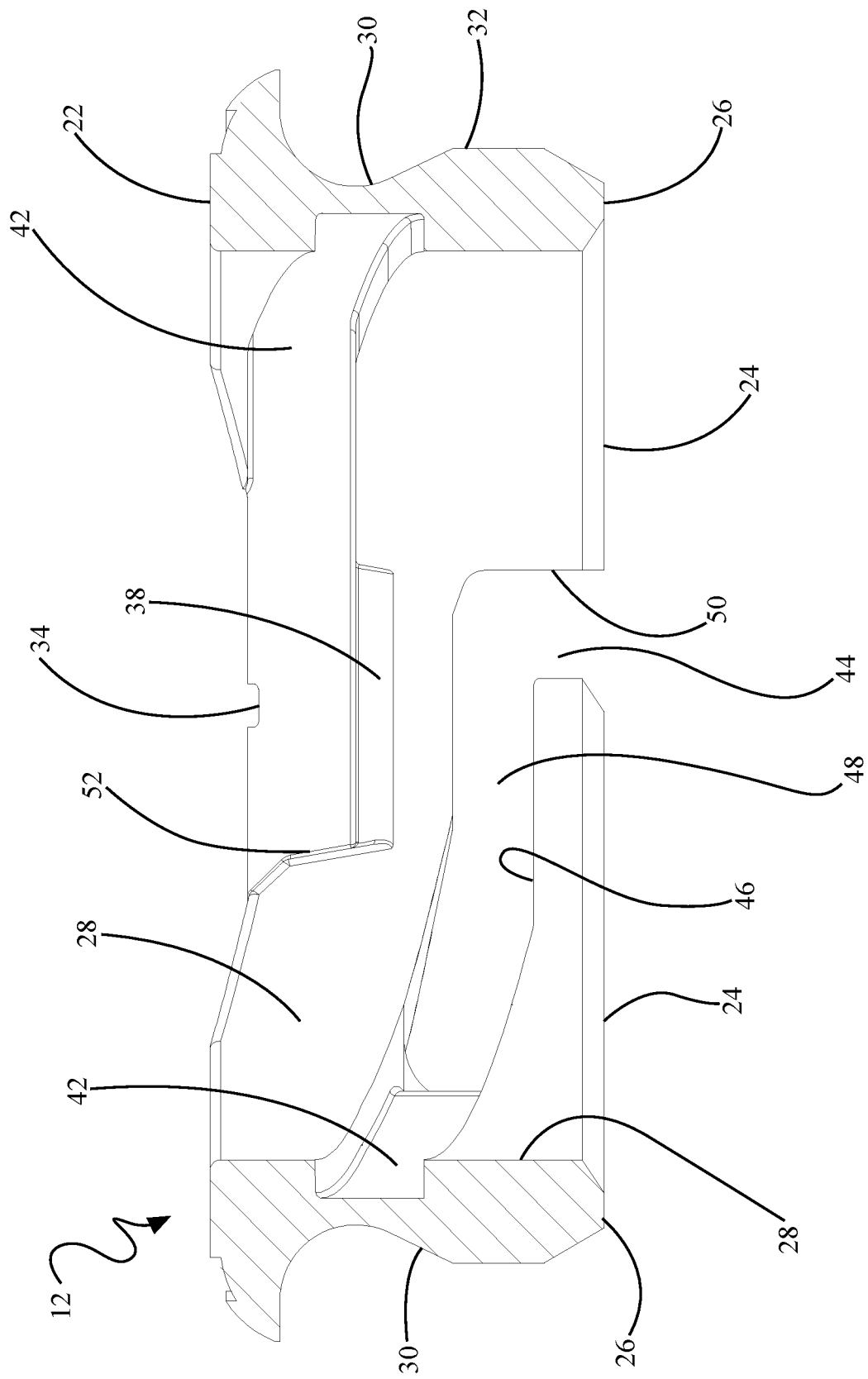
FIG. 3 is a vertical cross-sectional view of the fuel cell closure ring of FIG. 1.
Figure 6:
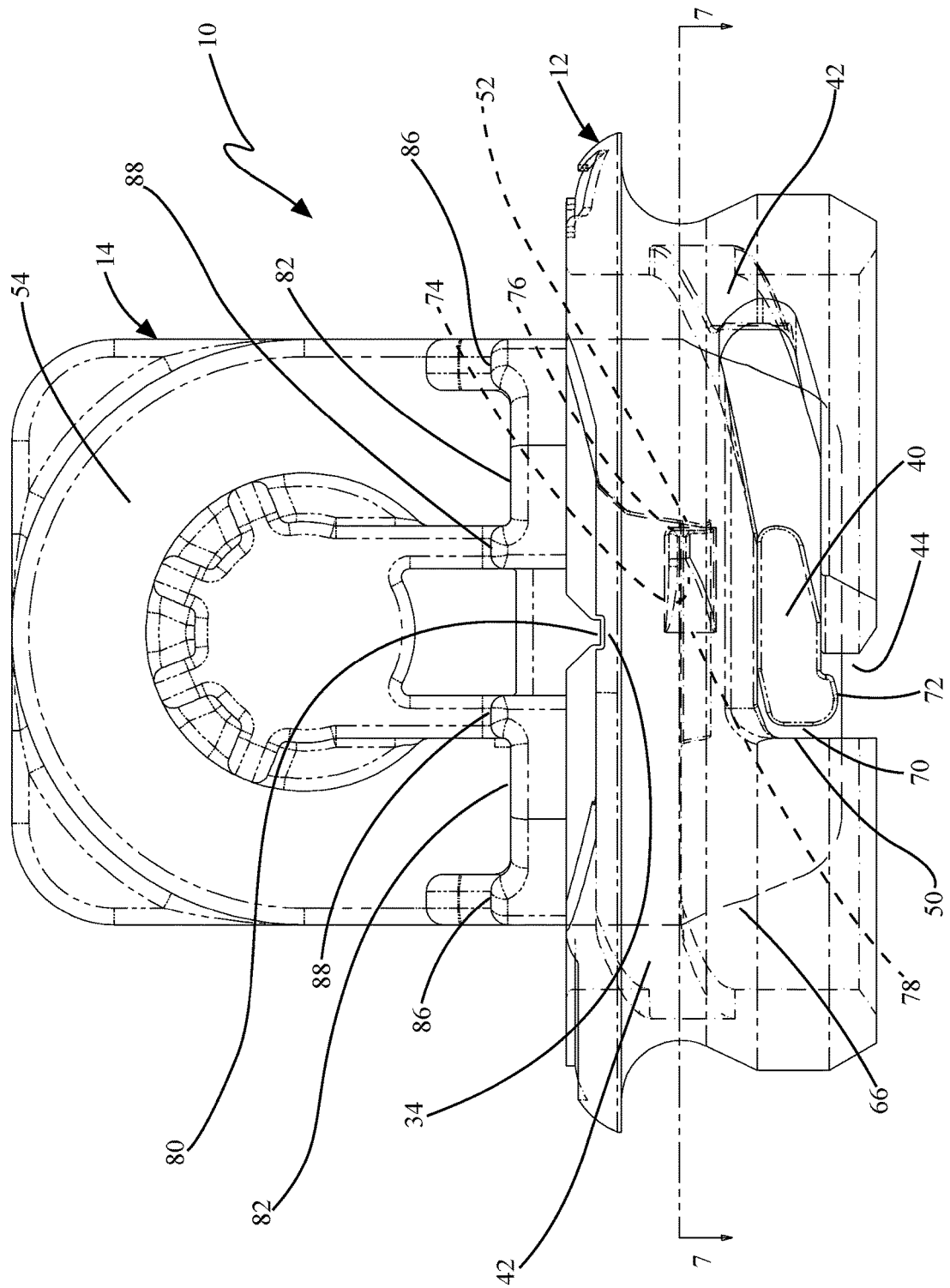
FIG. 6 is a rear elevational view of the metering valve of FIG. 1 engaged in the fuel cell closure ring of FIG. 1.
Figure 7:
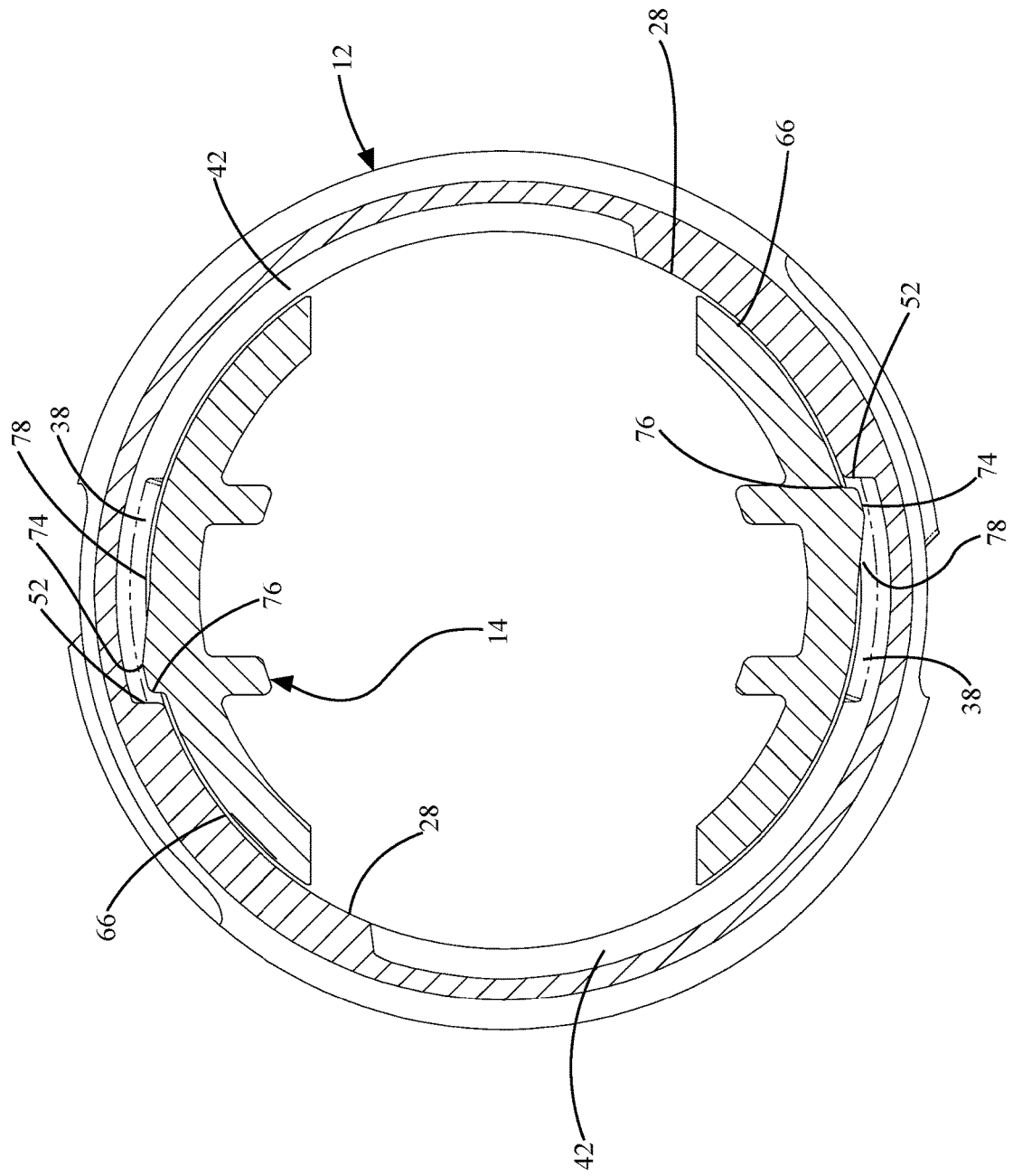
FIG. 7 is a cross-sectional view taken substantially along the line 7-7 of FIG. 6 and in the direction generally indicated.
Figure 8:
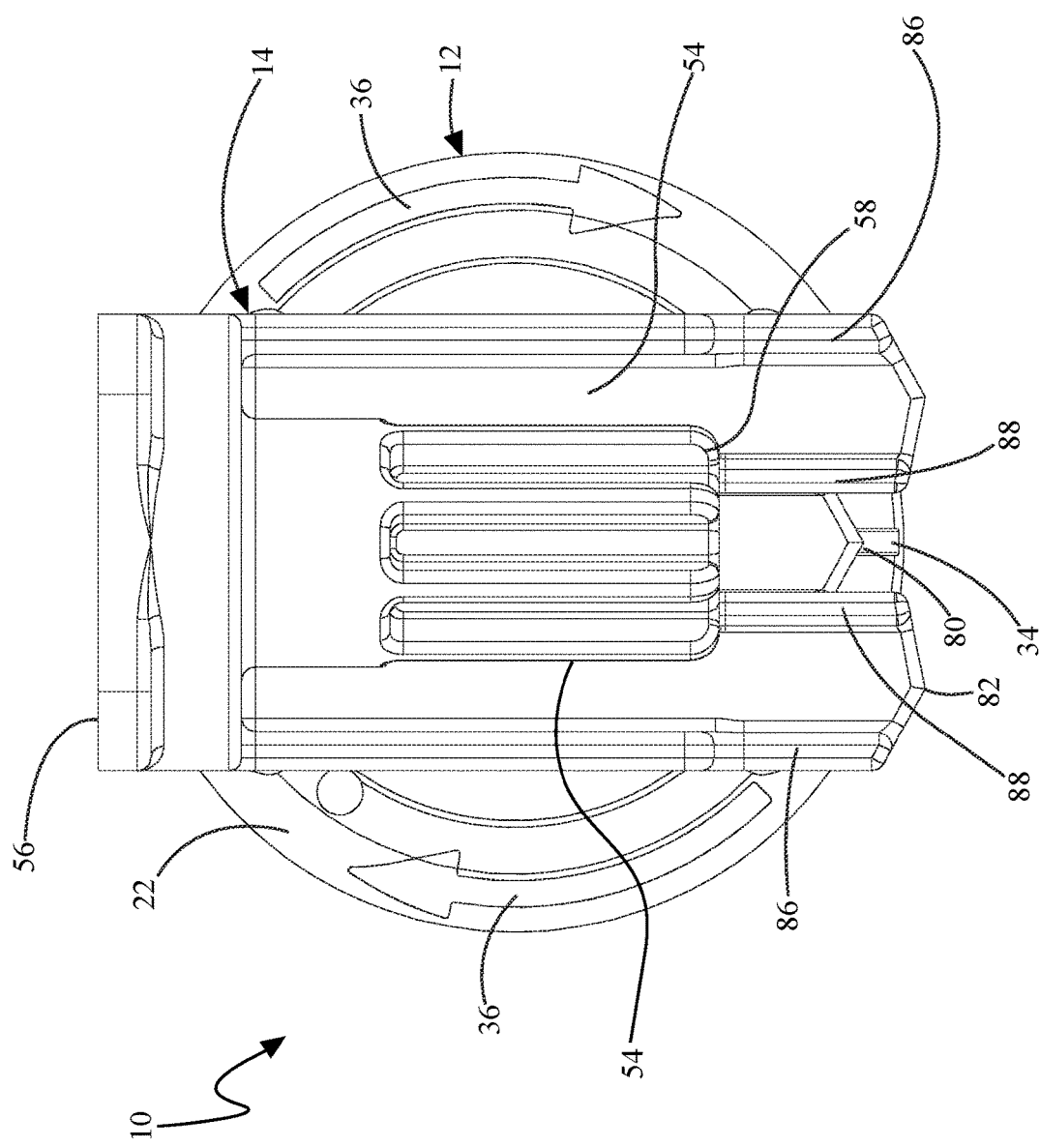
FIG. 8 is an overhead plan view of the metering valve of FIG. 4 engaged in the fuel cell closure ring of FIG. 1.

Referring now to FIGS. 2 and 3, the fuel cell closure ring 12 includes a top edge 22, an opposite bottom edge 24, and a sidewall 26 therebetween having an inner sidewall surface 28 and an outer sidewall surface 30. The outer sidewall surface 30 is radially expanded to form a convex gripping formation 32 that is complementary with, and frictionally engages the fuel cell bead 20. The top edge 22 defines at least one locating notch 34 to promote proper positioning of the metering valve 14. In the preferred embodiment, each notch 34 is "U"-shaped and the top edge 22 defines a pair of such notches 34, located diametrically opposite each other. Optional installation direction indicators 36 are also located on the top edge 22. The top edge 22 is dimensioned to slightly overhang the fuel cell bead 20 (as generally shown in FIGS. 11 and 12).

On the inner sidewall surface 28 near the top edge 22, an engagement chamfer 38 (as best seen in FIGS. 2 and 3) is recessed from the inner surface and provides a tactile location point for the threaded entry of a foot 40 of the metering valve 14 (as described in greater detail below). In the preferred embodiment, there are two such engagement chamfers 38, each located close to one of the locating notches 34. Each engagement chamfer 38 is in communication with a preferably helical groove 42 located on or defined by the inner sidewall surface 28 and extending from the engagement chamfer 38 to an opening 44 in communication with the bottom ring edge 24. In the preferred embodiment, the adapter 10 has a pair of grooves 42, each beginning at opposite sides of the top edge 22 and extending in opposite directions to the bottom edge 24 in a helical formation.

The opening 44 is in communication with an open track 46 forming the lower end of the groove 42 and open to the outer sidewall surface 30. The opening 44 and the open track 46 combine to define a primary recess 48. The primary recess 48 is partially defined by a stop 50 formed by the sidewall 26 that is configured to be engaged by the foot 40 at the end of the engagement travel.

Referring now to FIGS. 2 and 3, to prevent unwanted unthreading of the metering valve 14 on the fuel cell closure ring 12, the present adapter 10 includes or defines at least one, and preferably a pair of diametrically opposed secondary recesses 52 in communication with the groove 42. The secondary recesses 52 are located closely adjacent the engagement chamfer 38, however, being recessed into the inner sidewall surface 28 below, or closer to the bottom ring edge 24 than the engagement chamfer 38. Thus, each of the secondary recesses 52 is at least one of vertically or axially and circumferentially displaced from the at least one primary recess 48 (as best seen in FIGS. 2, 3, 6 and 7).

Referring now to FIGS. 1 and 4 to 8, the metering valve 14 has a body 54 with a first or stem end 56 and an opposite rear end 58. The first end 56 includes or defines an opening 60 in communication with a stem chamber 62. As is known in the art, the stem chamber 62 accommodates or is configured to receive a reciprocating metering valve stem 63 that is biased outwardly by a spring 64 (as best seen in FIGS. 11 and 12). Depending from the body 54 is at least one and preferably two legs 66, each preferably having the radially extending foot formation 40 configured for engaging the groove 42. More specifically, the foot formation 40 includes a radiused, relatively narrow tip 68 and a relatively thicker stop end 70 configured for engaging the stop 50, and also having a depending lug 72 that engages the opening 44 once the metering valve 14 is fully engaged on or in the fuel cell closure ring 12.

Referring now to FIGS. 4 to 7, another feature of the adapter 10 is that the metering valve 14 is provided with at least one supplemental locking lug 74 preferably located on each leg and constructed and arranged for engaging the at least one secondary recess 52 once the valve 14 is fully engaged on or in the fuel cell closure ring 12. Thus, in the preferred embodiment, the legs 66 are diametrically opposed from each other relative to the body 54, and each leg has a corresponding supplemental locking lug 74.

As it engages the secondary recess 52, the supplemental locking lug 74 is configured and arranged to provide a tactile indication to the user of full engagement of the metering valve 14 on or in the fuel cell closure ring 12. In addition, a feature of the example fuel cell closure ring 12 of the present disclosure is that the lug 74 is configured and arranged to resist unwanted unthreading of the metering valve 14 relative to the fuel cell closure ring 12.

Referring now to FIGS. 4, 5, 6 and 8, in the preferred embodiment, it will be seen that the supplemental locking lug 74 is at least one of vertically and circumferentially displaced from the foot formation 40. Also, the supplemental locking lug 74 extends radially from the corresponding leg 66, with a second end 76 extending farther from the leg than a first end 78, the first end 78 being tapered radially outwardly toward the second end 76 since the first end 78 engages the secondary recess 52 before the second end 76. Another feature of the metering valve 14 is at least one depending formation 80 configured and arranged for engaging the locator notch 34. The locator notch 34 provides some locking function, but is primarily provided for visual feedback to the operator to confirm the mounting of the metering valve 14 on or in the fuel cell closure ring 12. In the preferred embodiment, the formation 80 is generally wedge or "V"-shaped, sometimes with a square or rectangular lower edge, however other shapes are contemplated in accordance with the present disclosure.

Referring now to FIGS. 1, 5, 6, and 8, another feature of this example illustrated adapter 10 is that the body 54 is provided at the rear end 58 with at least one rearwardly projecting tool actuating formation 82. Preferably extending beyond an exterior surface 84 of the corresponding leg 66, the tool actuating formation 82 more positively engages a wider variety of combustion nailers, which have corresponding fuel cell actuators that vary somewhat from model to model. As shown, the formation 82 includes two pairs of laterally spaced ribs 86 and 88. However, a single rib is also contemplated in accordance with the present disclosure.

Figure 9:
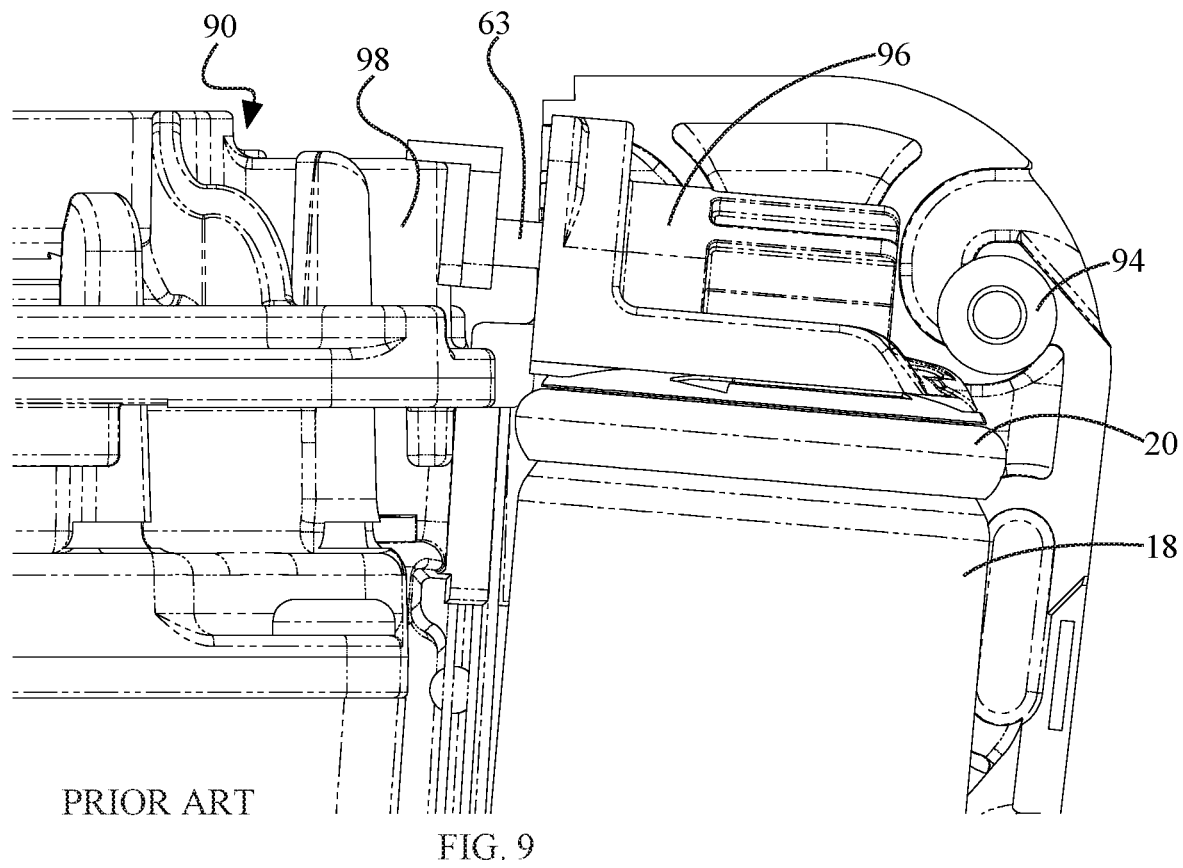
FIG. 9 is a fragmentary side elevational view of a prior art fuel cell and adapter mounted in a combustion nailer.
Figure 10:
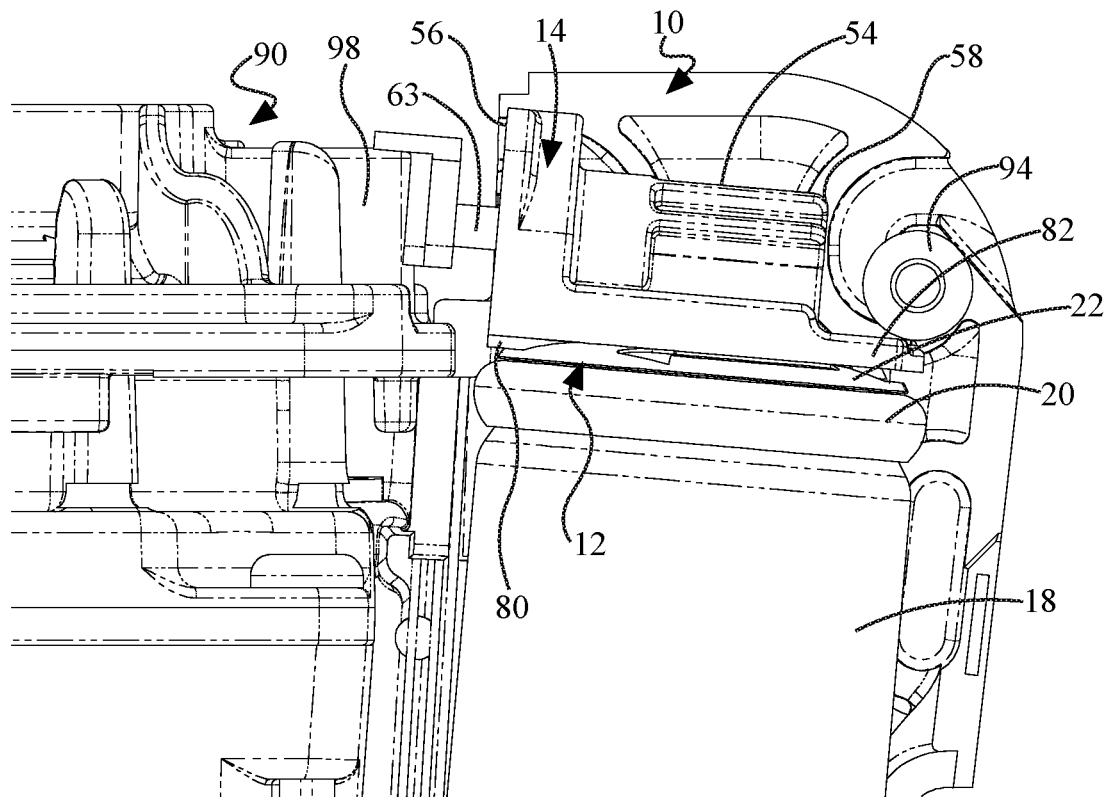
FIG. 10 is a fragmentary side elevational view of the adapter of FIG. 1 mounted on a fuel cell in a combustion nailer.

Referring now to FIGS. 9 and 10, the performance enhancement provided by the actuating formation 82 is generally demonstrated. FIG. 9 depicts a prior art fuel metering valve on a fuel cell 18 mounted in a combustion nailer 90, more specifically being located in a fuel cell chamber 92 as is well known in the art. A tool actuator 94, operated through a workpiece contact element (not shown) or other triggering device, well known in the field of combustion nailers, is configured and arranged to engage the conventional fuel cell metering valve 96 and cause the fuel cell metering valve 96 and the fuel cell 18 to pivot forward towards a cylinder head 98, which depresses the metering valve reciprocating stem 63 to cause a dose of fuel to be dispensed to a combustion chamber (not shown) defined in part by the cylinder head to prepare for the driving of a fastener. As seen in FIG. 9, in some models of combustion nailers 90, the tool actuator 94 does not properly engage the metering valve 96, which impairs operation of the nailer.

In contrast, as seen in FIG. 10, the example illustrated adapter 10 provides the actuating formation 82 that projects rearwardly, and is more dependably engaged by the tool actuator 94. Thus, the adapter 10 is more widely adaptable to a variety of combustion nailer configurations than prior art adapters.

Referring now to FIGS. 11 and 12, similar tool or nailer operation is depicted to the previous discussion about FIGS. 9 and 10; however, the internal components of the metering valve 14 and the fuel cell 18 are shown in somewhat greater detail. The specific configuration of certain components of the on-can metering valve 14 is discussed in further detail in commonly owned U.S. Pat. No. 6,302,297, which is incorporated by reference herein. Specifically, the stem chamber 62 is in fluid communication with an inlet cavity 100 that receives a fuel cell valve stem 102. Accordingly, fuel dispensed by the generally vertically oriented fuel cell 18 and valve stem 102 is diverted to a generally horizontal direction as the fuel passes to the metering valve stem 63 through the chamber 62. Only when the metering valve 14 is properly seated on the fuel cell closure ring 12 will the metering valve 14, and specifically the inlet cavity 100 be in a position to depress the fuel cell valve stem 102 sufficiently to dispense fuel. This is an advantage of the adapter 10, to enhance more positive engagement of the metering valve 14 with the fuel cell closure ring 12 for more reliable combustion nailer operation.

Upon installation of the metering valve 14 on the fuel cell 18, the fuel cell valve stem 102 is axially depressed to a fully retracted "container fill" position which enables full fluid communication with the stem chamber 62. Once the fuel cell valve stem 102 is fully depressed, the fuel escapes from the fuel cell valve stem 102, through the inlet cavity 100 and into a metering chamber 104 within and separated from the stem chamber 62. When the combustion nailer 90 is depressed against a workpiece, the metering valve stem 63 is forced inward or towards the stem chamber 62, compressing the metering valve spring 64 far enough so that the fuel will flow from the metering chamber 104, through the valve stem 63 into the cylinder head 98, and ultimately to the combustion chamber for driving of the fastener into the workpiece.

To attach the metering valve 14 to the fuel cell closure ring 12, which is frictionally secured to the fuel cell closure 16 at the peripheral bead 20, a user aligns the metering valve 14 so that the feet formations 66 are aligned with the engagement chamfers 38 of the fuel cell closure ring 12. Once properly aligned, the user turns the metering valve 14 clock-wise, such as by grasping the body 54, preferably provided with gripping ribs 106 located on the body 54, such that each foot formation 66 travels in its corresponding track groove 42 defined by the fuel cell closure ring 12. The gripping ribs 106 are also used for extracting the fuel cell 18 from the tool. When the foot formations 66 reach the opening 44 and engage the stop 50, at the same time, the supplemental locking lugs 74 engage the secondary recess 52, causing a tactile and potentially audible snap or click that is perceivable by the user. Simultaneously, the locators 80 engage the corresponding locator notch 34. At this time, the metering valve 14 is properly and positively engaged on the fuel cell closure ring 12, which means that the fuel cell valve stem 102 is sufficiently depressed to begin emitting fuel to the valve 14. Also at this time, upon movement by the tool actuator 94, fuel can travel to the combustion chamber for fastener driving. After use, if desired, the user can remove the metering valve 14 from the fuel cell closure ring 12 by counter-clockwise rotation.

While a particular embodiment of the present adapter for combustion tool fuel cells has been shown and described, it will be appreciated by those skilled in the art that changes and modifications may be made thereto without departing from the invention in its broader aspects and as set forth in the following claims.

The invention is claimed as follows:

1. An adapter for use with a fuel cell in a combustion tool, the combustion tool having an actuator, said adapter comprising:
   a fuel metering valve having a body with a first end configured to receive a reciprocating metering stem and an opposite second end;
   at least one leg depending from said body and having an exterior surface; and
   said second end having at least one tool actuating formation extending beyond said exterior surface and configured and arranged for being engaged by the actuator for dispensing a dose of fuel from the metering stem.

2. The adapter of claim 1, wherein the at least one leg includes a pair of said legs, each said leg including a foot formation radially extending from said exterior surface, and a supplemental locking lug displaced at least one of vertically and circumferentially from said foot formation.

3. The adapter of claim 2, which includes a ring configured for engagement upon the closure formation of the fuel cell and which includes a top edge, a bottom edge, and a sidewall therebetween having an inner sidewall surface and an outer sidewall surface;

a groove defined by said inner sidewall surface and having a primary recess in communication with said groove; and a secondary recess in communication with said groove, said secondary recess configured and arranged for accommodating a corresponding one of said supplemental locking lugs.

* * * * *